(12) United States Patent
Manthiram et al.

(10) Patent No.: US 7,678,503 B2
(45) Date of Patent: Mar. 16, 2010

(54) SURFACE AND BULK MODIFIED HIGH CAPACITY LAYERED OXIDE CATHODES WITH LOW IRREVERSIBLE CAPACITY LOSS

(75) Inventors: Arumugam Manthiram, Austin, TX (US); Yan Wu, Austin, TX (US)

(73) Assignee: Board of Regents, The University of Texas Systems, Austin, TX (US)

( * ) Notice: Subject to any disclaimer, the term of this patent is extended or adjusted under 35 U.S.C. 154(b) by 38 days.

(21) Appl. No.: 11/861,248

(22) Filed: Sep. 25, 2007

(65) Prior Publication Data

US 2009/0224212 A1 Sep. 10, 2009

Related U.S. Application Data

(60) Provisional application No. 60/847,014, filed on Sep. 25, 2006.

(51) Int. Cl.
| | |
|---|---|
| H01M 4/58 | (2006.01) |
| H01M 4/62 | (2006.01) |
| H01M 4/00 | (2006.01) |
| H01M 4/50 | (2006.01) |
| H01M 4/66 | (2006.01) |
| C01D 7/00 | (2006.01) |
| C01D 1/02 | (2006.01) |

(52) U.S. Cl. .......................... 429/231.95; 429/231.3; 429/231.6; 429/232; 429/217; 429/218.1; 429/245; 429/224; 429/223; 429/231.5; 429/231.9; 423/421; 423/594.4; 423/594.6

(58) Field of Classification Search .................. 429/194, 429/231, 220, 231.95, 231.1, 231.3, 223, 429/218.1, 219, 224, 229, 231.6, 217, 232, 429/245, 90; 423/420.2, 594.4, 594.6
See application file for complete search history.

(56) References Cited

U.S. PATENT DOCUMENTS

| | | | | |
|---|---|---|---|---|
| 5,636,577 | A * | 6/1997 | Gow | 108/57.17 |
| 5,639,577 | A * | 6/1997 | Takeuchi et al. | 429/219 |
| 6,623,886 | B2 * | 9/2003 | Yang et al. | 429/218.1 |
| 2004/0091779 | A1 * | 5/2004 | Kang et al. | 429/231.1 |

OTHER PUBLICATIONS

Ammundsen, B., et al., "Local Structure and First Cycle Redox Mechanism of Layered Li1.2Cr0.4Mn0.4O2 Cathode Material," J Electrochem Soc (2002), 149:A431-A436.
Barkhouse, D. A. R., et al., "A Novel Fabrication Technique for Producing Dense Li[NixLi(1/3-2x/3)Mn(2/3-x/3)]O2, 0 ≦x ≦1/2," J Electrochem Soc (2005), 152:A746-A751.
Chebiam, R. V., et al., "Soft Chemistry Synthesis and Characterization of Layered $Li_{1-y}CoyO_2-\delta$ ($0 \leq x \leq 1$ and $0 \leq y \leq 1$)," Chem Mater (2001), 13:2951-2957.
Cho, J., et al., Improvement of Structural Stability of LiCoO2 Cathode during Electrochemical Cycling by Sol-Gel Coating of SnO2, Electrochem Solid State Lett (2000), 3:362-365.
Jiang, J., et al., "Structure, Electrochemical Properties, and Thermal Stability Studies of Cathode Materials in the xLi[Mn1/2Ni1/2]O2-yLiCoO2-zLi[Li1/3Mn2/3]O2 Pseudoternary System (x +y +z=1)," J Electrochem Soc (2005), 152: A1879-A1889.
Kang, S.-H., et al., "Electrochemical and Ex Situ X-Ray Study of Li(Li0.2Ni0.2Mn0.6)O2 Cathode Material for Li Secondary Batteries," Electrochem Solid State Lett (2003), 6:A183-A186.
Kang, S.-H., et al., "Synthesis and electrochemical properties of layer-structured 0.5Li(Ni0.5Mn0.5)O2-0.5Li (Li1/3Mn2/3)O2 solid mixture," J Power Sources (2003), 124:533-537.
Kang, Y.-J., et al., "The effect of Al(OH)3 coating on the Li[Li0.2Ni0. 2Mn0.6]O2 cathode material for lithium secondary battery," Electrochim Acta (2005), 50:4784-4791.
Kannan, A. M., et al., "High Capacity Surface-Modified LiCoO2 Cathodes for Lithium-Ion Batteries," Electrochem Solid State Lett (2003), 6:A16-A18.
Kim, Y. J., et al., "The Effect of Al2O3 Coating on the Cycle Life Performance in Thin-Film LiCoO2 Cathodes," J Electrochem Soc (2002), 149:A1337-A1341.
Kweon, H.-J., et al., "Effects of metal oxide coatings on the thermal stability and electrical performance of LiCoCO2 in a Li-ion cell," J Power Sources (2004), 126:156-162.
Lu, Z., et al., "Synthesis, Structure, and Electrochemical Behavior of Li[NixLi(1/3-2x/3)Mn(2/3-x/3)]O2," J Electrochem Soc (2002), 149:A778-A791.
Lu, Z., et al., "Understanding the Anomalous Capacity of Li/Li[NixLi(1/3-2x/3)Mn(2/3-x/3)]O2," J Electrochem Soc (2002), 149:A815-A822.
Myung, S.-T., et al., "Role of Alumina Coating on Li-Ni-Co-Mn-O Particles as Positive Electrode Material for Lithium-Ion Batteries," Chem Mater (2005), 17:3695-3704.
Park, Y. J., et al., "Structural investigation and electrochemical behaviour of Li[NixLi(1/3-2x/3)Mn(2/3-x/3)]O2 compounds by a simple combustion method," J Power Sources (2004), 129:288-295.
Robertson, A. D., et al., "Overcapacity of Li[NixLi1/3-2x/3Mn2/3-x/3]O2 Electrodes," Electrochem Solid State Lett (2004), 7:A294-A298.
Venkatraman, S., et al., "Phase Relationships and Structural and Chemical Stabilities of Charged Li1-xCoO2-δ and Li1-xNi0.85Co0. 15O2- δ Cathodes," Electrochem Solid State Lett (2003) 6:A9-A12.
Zhang, L., et al., "Novel Layered Li-Cr-Ti-O Cathode Materials Related to the LiCrO2-Li2TiO3 Solid Solution," J Electrochem Soc (2003), 150:A601-A607.
International Search Report and Written Opinion for PCT/US2007/079466 dated Mar. 28, 2008.

(Continued)

*Primary Examiner*—Ling-Siu Choi
*Assistant Examiner*—Monique Peets
(74) *Attorney, Agent, or Firm*—Fish & Richardson P.C.

(57) ABSTRACT

The present invention includes compositions, surface and bulk modifications, and methods of making of $(1-x)Li[Li_{1/3} Mn_{2/3}]O_2 \cdot xLi[Mn_{0.5-y}Ni_{0.5-y}Co_{2y}]O_2$ cathode materials having an O3 crystal structure with a x value between 0 and 1 and y value between 0 and 0.5, reducing the irreversible capacity loss in the first cycle by surface modification with oxides and bulk modification with cationic and anionic substitutions, and increasing the reversible capacity to close to the theoretical value of insertion/extraction of one lithium per transition metal ion (250-300 mAh/g).

34 Claims, 5 Drawing Sheets

OTHER PUBLICATIONS

Ammundsen et al., "Local Structure and First Cycle Redox Mechanism of Layered $Li_{1.2}Cr_{0.4}Mn_{0.4}O_2$ Cathode Material," J. Electrochem. Soc., 149(4):A431-A436, (2002).

Barkhouse and Dahn, "A Novel Fabrication Technique for Producing Dense $Li\ Ni_xLi_{(1/3-2x/3)}Mn_{(2/3-x/3)}O_2$, $0 \leq \chi \leq 1/2$," J. Electrochem. Soc., 152(4):A746-A751, (2005).

Chebiam et al., "Soft Chemistry Synthesis and Characterization of Layered $Li_{1-x}Ni_{1-y}Co_yO_{2-\delta}$ ($0 \leq x \leq 1$ and $0 \leq y \leq 1$)," Chem. Mater., 13:2951-2957, (2001).

Cho et al., "Improvement of Structural Stability of $LiCoO_2$ Cathode during Electrochemical Cycling by Sol-Gel Coating of $SnO_2$," Electrochem. Solid State Lett., 3(8):362-365, (2000).

Jiang et al., "Structure, Electrochemical Properties, and Thermal Stability Studies of Cathode Materials in the $\chi Li[Mn_{1/2}Ni_{1/2}]O_2\ \gamma LiCoO_2\ zLi[Li_{1/3}Mn_{2/3}]O_2$ Pseudoternary System) (x+y+z=1)," J. Electrochem. Soc., 152, A1879 (2005).

Kang et al., "Electrochemical and Ex Situ X-Ray Study of $Li(Li_{0.2}Ni_{0.2}Mn_{0.6})O_2$ Cathode Material for Li secondary Batteries," Electrochem. Solid State Lett., 6(9):A183-A186, (2003).

Kang et al., "The effect of $Al(OH)_3$ coating on the $Li[Li_{0.2}Ni_{0.2}Mn_{0.6}]O_2$ cathode material for lithium secondary battery," Electrochimica Acta, 50:4784-4791, (2005).

Kang and Amine, "Synthesis and electrochemical properties of layer-structured $0.5Li(Ni_{0.5}Mn_{0.5})O_2-0.5Li(Li_{1/3}Mn_{2/3})O_2$ solid mixture," J. Power Sources, 124, 533-537, (2003).

Kannan et al., "High Capacity Surface-Modified LiCoO2 Cathodes for Lithium-Ion Batteries," Electrochem. Solid State Lett., 6(1):A16-A18, (2003).

Kim et al., "The Effect of $Al_2O_3$ Coating on the Cycle Life Performance in Thin-Film $LiCoO_2$ Cathodes," J. Electrochem. Soc., 149(10):A1337-A1341, (2002).

Kweon et al., "Effects of metal oxide coatings on the thermal stability and electrical performance of $LiCoCO_2$ in a Li-ion cell," J. Power Sources, 126:156-162, (2004).

Lu and Dahn, "Understanding the Anomalous Capacity of Li/Li $Ni_xLi_{(1/3-2x/3)}Mn_{(2/3-x/3)}O_2$ Cells Using In Situ X-Ray Diffraction and Electrochemical Studies," J. Electrochem. Soc., 149(7):A815-A822, (2002).

Lu et al., "Synthesis, Structure and Electrochemical Behavior of $Li[Ni_xLi_{1/3-2x/3}Mn_{2/3-x/3}]O_2$," J. Electrochem. Soc., 149(6):A778-A791, (2002).

Myung et al., "Role of Alumina Coating on Li-Ni-Co-Mn-O Particles as positive Electrode Material for Lithium-Ion Batteries," Chem. Mater., 17:3695-3704, (2005).

Park et al., "Structural investigation and electrochemical behaviour of $Li[Ni_xLi_{(1/3-2x/3)}Mn_{(2/3-x/3)}]O_2$, compounds by a simple combustion method," J. Power Sources, 129:288-295, (2004).

Robertson and Bruce, "Overcapacity of $Li[Ni_xLi_{(1/3-2x/3)}Mn_{2/3-x/3}]O_2$ Electrodes," Electrochem. Solid State Lett., 7(9):A294-A298, (2004).

Venkatraman et al., "Phase Relationships and Structural and Chemical Stabilities of Charged $Li_{1-x}CoO_{2-\delta}$ and $Li_{1-x}Ni_{0.85}Co_{0.15}O_{2-\delta}$ Cathodes," Electrochem. Solid State Lett., 691):A9-A12, (2003).

Wu et al., "Surface Modification of High Capacity Layered $Li[Li_{0.2}Mn_{0.54}Ni_{0.13}Co_{0.13}]O_2$ Cathodes by $AlPO_4$," J. Electrochem. Soc., 155(9):A635-A641, (2008).

Wu and Manthiram, "Effect of surface modifications on the layered solid solution cathodes $(1-z)\ Li[Li_{1/3}Mn_{2/3}]O_2-(z)\ Li[Mn_{0.5-y}Ni_{0.5-y}Co_{2y}]O_2$," Solid State Ionics, 180:50-56, (2009).

Zhang and Noguchi, "Novel Layered Li-Cr-Ti-) Cathode Materials Related to the $LiCrO_2·Li_2TiO_3$ Solid Solution," J. Electrochem. Soc., 150(5):A601-A607, (2003).

* cited by examiner 2A          2B

SURFACE AND BULK MODIFIED HIGH CAPACITY LAYERED OXIDE CATHODES WITH LOW IRREVERSIBLE CAPACITY LOSS

CROSS-REFERENCE TO RELATED APPLICATIONS

This application claims priority to U.S. Provisional Application Ser. No. 60/847,014, filed Sep. 25, 2006, the contents of which is incorporated by reference herein in its entirety.

STATEMENT OF FEDERALLY FUNDED RESEARCH

This invention was made with U.S. Government support under Contract No. 1270402 awarded by the NASA and under Contract No. DE-AC03-76SF00098 (Subcontract No. 6712770) awarded by the U.S. Department of Energy. The government has certain rights in this invention.

TECHNICAL FIELD OF THE INVENTION

The present invention relates in general to the field of lithium-ion cathode materials, more particularly to the use of layered lithium transition metal oxide cathode materials having the O3 type structure of $LiCoO_2$.

BACKGROUND OF THE INVENTION

Without limiting the scope of the invention, its background is described in connection with layered lithium ion battery electrodes and layered lithium ion battery electrode materials.

The miniaturization of portable electronic devices has created a necessity for smaller, lighter, more durable batteries as their power source. To address this need, a lithium ion battery has been developed having a high capacity, small size, and light weight. Generally, the lithium ion battery has electrodes that can occlude and release lithium ions without requiring electrodeposition of lithium metal. The lithium ion can migrate from the anode into the electrolyte and occlude (by intercalation) from the electrolyte at the cathode. The anode is commonly made of a carbonaceous material and the cathode is made of a lithium transition metal oxide.

Although, cathode materials of lithium metal oxides have a theoretical capacity of around 280 mAh/g, the full capacity of these materials cannot be achieved in practice, and only about 140 mAh/g can be used. Furthermore, overcharging results in lithium removal that degrades the cyclability of these materials.

In addition, lithium cobalt oxide and lithium nickel oxide also may undergo a decomposition reaction on overcharge. For example, layered $LiNi_{0.5}O_2$ transforms to the spinel $LiNi_2O_4$ on heating to above 200° C.; at about 245° C., the delithiated material also experiences significant oxygen generation and heat liberation due to decomposition.

SUMMARY OF THE INVENTION

The present inventors recognized that only 50% of the theoretical capacity of the currently used $LiCoO_2$ is being used in practical lithium ion cells due to the chemical and structural instabilities at deep charge and that cobalt is relatively expensive and toxic. The inventors recognizes a need for a cathode material that exhibit much higher capacity with lower cost and better safety features than the currently used $LiCoO_2$ cathode.

The present invention provides layered oxide cathode compositions as well as surface modification procedures for reducing the irreversible capacity loss and increasing the discharge capacity to about the theoretical value involving the reversible extraction of close to one lithium ion per formula unit. The surface modification suppresses undesired reactions of the cathode surface with the electrolyte, alters the solid-electrolyte interface (SEI) layer, and thereby lowers the irreversible capacity loss.

Layered $(1-x)Li[Li_{1/3}Mn_{2/3}]O_2 \cdot xLi[Mn_{0.5-y}Ni_{0.5-y}Co_{2y}]O_2$ cathodes belonging to a solid solution series between $Li[Li_{1/3}Mn_{2/3}]O_2$ and $Li[Mn_{0.5-y}Ni_{0.5-y}Co_{2y}]O_2$ with the value of x between 0 and 1 and the value of y between 0 and 0.5 have been synthesized and characterized by charge-discharge measurements in lithium cells before and after modifying their surface with oxides like $Al_2O_3$, $CeO_2$, $ZrO_2$, $ZnO$, $TiO_2$, $SnO_2$, and $SiO_2$ as well as before and after modifying their bulk and surface with cationic and anionic substitutions with metals and nonmetal ions like $Al^{3+}$ and $F^-$. The surface modified cathodes show significantly lower irreversible capacity loss (ICL) and higher discharge capacity with excellent cyclability compared to the unmodified counterparts. For example, $Li[Li_{0.2}Mn_{0.54}Ni_{0.13}Co_{0.13}]O_2$ with x=0.4 and y=⅙ shows a remarkably high capacity of 285 mAh/g with an irreversible capacity loss of 41 mAh/g and good rate capability. This capacity value is much higher than that achieved with the previously known $Li[Li_{0.17}Mn_{0.58}Ni_{0.25}]O_2$ with x=0.5 and y=0 after similar surface modification (<255 mAh/g).

The present invention provides a method of making a $(1-x)Li[Li_{1/3}Mn_{2/3}]O_2 \cdot xLi[Mn_{0.5-y}Ni_{0.5-y}Co_{2y}]O_2$ cathode composition by mixing two or more co-precipitated transition metal hydroxides with a lithium hydroxide and firing the two or more co-precipitated transition metal hydroxides-lithium hydroxide mixture to form a $(1-x)Li[Li_{1/3}Mn_{2/3}]O_2 \cdot xLi[Mn_{0.5-y}Ni_{0.5-y}Co_{2y}]O_2$ material having an O3 crystal structure. The two or more co-precipitated transition metal hydroxides are formed by adding one or more transition metal acetate solutions to a basic solution.

The present invention also provides a cathode composition including $(1-x)Li[Li_{1/3}Mn_{2/3}]O_2 \cdot xLi[Mn_{0.5-y}Ni_{0.5-y}Co_{2y}]O_2$ having an O3 crystal structure and in some instances, when incorporated in a lithium-ion battery, the capacity is between about 250 and 300 mAh/g and an irreversible capacity loss of between about 30 and 50 mAh/g. The $(1-x)Li[Li_{1/3}Mn_{2/3}]O_2 \cdot xLi[Mn_{0.5-y}Ni_{0.5-y}Co_{2y}]O_2$ cathode composition has an x value between about 0.0 and about 1.0 and y value between 0 and 0.5, e.g., when x=0.5 and y=0, the resulting cathode composition is $Li[Li_{0.17}Mn_{0.58}Ni_{0.25}Co_{0.0}]O_2$, when x=0.4 and y=⅙, the resulting cathode composition is $Li[Li_{0.2}Mn_{0.54}Ni_{0.13}Co_{0.13}]O_2$, when x=0.7 and y=⅙, the resulting cathode composition is $Li[Li_{0.1}Mn_{0.44}Ni_{0.23}Co_{0.23}]O_2$, when x=1.0 and y=⅙, the resulting cathode composition is $Li[Mn_{1/3}Ni_{1/3}Co_{1/3}]O_2$, and when x=0.4 and y=⅓, the resulting composition is $Li[Li_{1/5}Co_{4/15}Ni_{1/15}Mn_{7/15}]O_2$.

For example, the present invention includes a method of making a lithium cathode by mixing a $(1-x)Li[Li_{1/3}Mn_{2/3}]O_2 \cdot xLi[Mn_{0.5-y}Ni_{0.5-y}Co_{2y}]O_2$ cathode composition with a conductive diluent and a binder and forming the mixture into a cathode shape. The cathode shape will depend on the final application or use of the cathode, e.g., generally cylindrical or generally disk shaped.

The binder includes powdered polytetrafluoroethylene or polyvinylidene fluoride. Suitable conductive diluent materials for this purpose include acetylene black, carbon black and/or graphite or a metallic powder such as powdered nickel, aluminum, titanium or stainless steel. For example, the binder may be powdered polytetrafluoroethylene at about 1 to about 10 weight percent of the cathode mixture, the conductive diluent comprises acetylene black at about 5 to about 25 weight percent of the cathode mixture, and the $Li[Li_{(1-x)/3}Mn_{(2-x)/3}Ni_{x/3}Co_{x/3}]O_2$ cathode composition may be about 70 to about 95 weight percent of the cathode mixture.

The present invention provides a method of modifying a layered oxide with a metal oxide by dispersing a $(1-x)Li[Li_{1/3}Mn_{2/3}]O_2 \cdot xLi[Mn_{0.5-y}Ni_{0.5-y}Co_{2y}]O_2$ composition in a metal salt precursor solution. Ammonium hydroxide is added to the metal salt precursor solution to precipitate a metal hydroxide. The layered oxide containing the metal hydroxide is then heated to obtain a surface modified layered oxide. The metal salt precursor solution includes Al, Ce, Zn or a combination thereof and the metal oxide comprises $Al_2O_3$, $CeO_2$, ZnO or combinations thereof.

The present invention also provides a method of modifying a layered oxide with a metal oxide by dispersing a $(1-x)Li[Li_{1/3}Mn_{2/3}]O_2 \cdot xLi[Mn_{0.5-y}Ni_{0.5-y}Co_{2y}]O_2$ composition in a metal alkoxide solution. Water is added to the metal alkoxide solution, wherein the alkoxide solution is hydrolyzed and metal hydroxides are generated. The layered oxide containing the metal hydroxide is heated to form a surface modified layered oxide. The metal salt precursor solution includes Zr, Si, Ti or a combination thereof.

A method of fluoride modifying a layered oxide cathodes by combining a layered oxide cathodes with $NH_4HF_2$ at a low temperature of between 300 and 500° C. is also provided.

In addition, the present invention provides a method of modifying a layered oxide cathode with a metal oxides by dispersing a $(1-x)Li[Li_{1/3}Mn_{2/3}]O_2 \cdot xLi[Mn_{0.5-y}Ni_{0.5-y}Co_{2y}]O_2$ composition in a metal salt or metal alkoxide solution and adding ammonium hydroxide or water to precipitate the metal hydroxide or to hydrolyze the metal alkoxide to produce metal hydroxide. The product obtained is then heated at about 300° C. to 700° C. in air for about 4 hours, wherein the metal oxide content in the final product is between 2 and 10 weight percent. The surface modifying oxides include, for example, $Al_2O_3$, $ZrO_2$, $CeO_2$, $SiO_2$, $TiO_2$, and ZnO. The invention also provides methods for the surface modification with fluoride, which was accomplished by heating the already formed layered oxide cathodes with a fluorinating agent $NH_4HF_2$ at a low temperature of between 300 and 500° C.

In addition, the invention provides methods for bulk modification via cationic and anionic substitutions with ions like $Al^{3+}$ and $F^-$. While the $Al^{3+}$ substitution was achieved by incorporating the aluminum ions into the mixed transition metal hydroxide precursors during the coprecipitation process before firing at 900° C., the fluorine substitution was achieved by firing the coprecipitated metal hydroxides with a mixture of lithium fluoride and lithium hydroxide at 900° C.

For example, the present invention provides a method of making a bulk modified cathode composition by co-precipitating a metal hydroxide mixture comprising hydroxides of two or more transition metal ions and one or more metal ions and then forming a mixture of the co-precipitated metal hydroxide mixture and lithium hydroxide. The mixture is fired to form a cation substituted bulk modified cathode composition. The one or more metal ions may include Mg, Ti, V, Cr, Fe, Cu, Zn, Zr, Nb, Mo, W, Ga, Ca, and Cd and the mixture may be fired at a temperature of between about 800° C. and about 1000° C. The present invention also includes the composition made by this process.

The present invention also provides a method of making a bulk modified cathode composition by co-precipitating a metal hydroxide mixture comprising hydroxides of two or more transition metal ions and forming a mixture comprising the metal hydroxide mixture, lithium hydroxide and an anionic substitution compound. The mixture is fired to form a bulk modified anion substituted cathode composition. The anionic substitution compound may be lithium fluoride, lithium chloride, lithium sulfide or a combination thereof depending on the substitution desired by the skilled artisan. The present invention also includes the composition made by this process.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
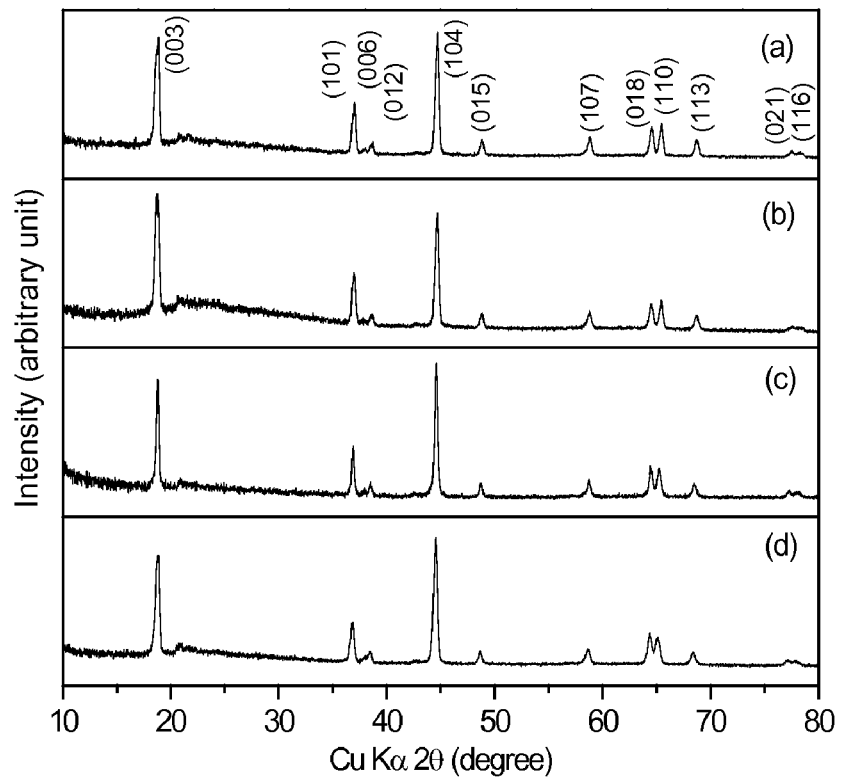
FIG. 1 is an XRD pattern of samples having the O3 type structure of $LiCoO_2$.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein the term "Ampere-hour (Ah)" refers to the units used in specifying the storage capacity of a battery. For example, a battery with 1 Ah capacity can supply a current of one ampere for one hour or 0.5 A for two hours, etc. 1 Ampere-hour (Ah) is the equivalent of 3600 coulombs of electrical charge.

As used herein the term "basic" refers to an aqueous solution containing more $OH^-$ ions than $H^+$ ions. Generally, the aqueous solution has a pH greater than about 7, e.g., lithium hydroxide, sodium hydroxide, potassium hydroxide, rubidium hydroxide, cesium hydroxide, magnesium hydroxide, calcium hydroxide, strontium hydroxide, barium hydroxide, and ammonium hydroxide.

As used herein the term "C Rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour and the full energy in 10 hours; and a 5 C means utilization of the full energy in 12 minutes.

As used herein the term metal oxides include precursors of the metal oxides such as nitrates, carbonates and acetates which can be converted to their corresponding metal oxides by heat treatment.

Surface modified layered $Li[Li_{0.2}Mn_{0.54}Ni_{0.13}Co_{0.13}]O_2$ cathodes belonging to a solid solution series between layered $Li[Li_{1/3}Mn_{2/3}]O_2$ and $Li[Ni_{1/3}Mn_{1/3}Co_{1/3}]O_2$ exhibit a remarkably high reversible capacity of 285 mAh/g with excellent cyclability and low irreversible capacity loss. This capacity value of 285 mAh/g corresponds to a reversible extraction of 0.9 lithium ion per formula unit, and it is much higher than that found with any of the layered oxide compositions previously reported in the literature (e.g., <255 mAh/g) at similar C rates. The surface modification with $Al_2O_3$ suppresses the reaction between the cathode surface and the electrolyte, and thereby decreases the irreversible capacity loss and increases the reversible discharge capacity. Further optimization of the layered oxide cathode compositions as well as surface modification procedures can increase the capacity to the theoretical value involving the reversible extraction of one lithium ion per formula unit.

Lithium ion batteries have become attractive for portable electronic devices such as cell phones and laptop computers due to their high energy density. However, only 50% of the theoretical capacity of the currently used $LiCoO_2$ could be used in practical lithium ion cells (e.g., 140 mAh/g) due to the chemical and structural instabilities at deep charge with $(1-x)$ <0.5 in $Li_{1-x}CoO_2$.[1,2] Also, cobalt is relatively expensive and toxic. These difficulties have generated enormous interest in alternative cathode hosts. In this regard, solid solutions between layered $Li[Li_{1/3}Mn_{2/3}]O_2$ (commonly designated as $Li_2MnO_3$) and $LiMO_2$ (M=$Mn_{0.5}Ni_{0.5}$,[3-7] Co,[8] and Cr[9,10]) have become appealing as some of them exhibit much higher capacity with lower cost and better safety features compared to the currently used $LiCoO_2$ cathode. For example, layered oxide compositions belonging to the series $(1-x)Li[Li_{1/3}Mn_{2/3}]O_2 \cdot xLi[Mn_{0.5}Ni_{0.5}]O_2$, which is a solid solution between $Li[Li_{1/3}Mn_{2/3}]O_2$ and $Li[Mn_{0.5}Ni_{0.5}]O_2$, have been found to exhibit capacities as high as 250 mAh/g on cycling them to 4.8 V.[3-7]

However, the discharge capacities of the $(1-x)Li[Li_{1/3}Mn_{2/3}]O_2 \cdot xLi[Mn_{0.5}Ni_{0.5}]O_2$ cathodes are often much higher than the theoretical capacity values expected based on the initial oxidation states of manganese and nickel, and the first charge profile is accompanied by an irreversible voltage plateau for oxidation involving beyond the formal oxidation states of $Mn^{4+}$ and $Ni^{4+}$. The voltage plateau has been attributed to an irreversible loss of oxygen from the lattice based on in-situ X-ray diffraction studies.[11] The oxygen loss leads to a lowering of the oxidation states of Mn and Ni correspondingly at the end of first discharge, which facilitates a higher reversible capacity with good cyclability in the subsequent cycles as the system operates with the chemically more stable $Mn^{3+/4+}$ and $Ni^{3+/4+}$ couples compared to the $Co^{3+/4+}$ couple.[1,2] More recently, an ion exchange of $Li^+$ by $H^+$ in addition to the loss of oxygen has been suggested from thermogravimetric analysis and mass spectrometry.[12]

In addition to the irreversible oxygen loss during the first charge, the $(1-x)Li[Li_{1/3}Mn_{2/3}]O_2 \cdot xLi[Mn_{0.5}Ni_{0.5}]O_2$ compositions exhibit an undesirable, irreversible capacity loss (ICL) of 40-100 mAh/g in the first cycle depending on the composition upon charging to 4.8 V.[3-7] The high irreversible capacity loss could originate from a reaction of the cathode surface with the electrolyte, particularly with the high cutoff charge voltages of 4.8 V. One way to overcome this is to modify the cathode surface by coating with inert oxides and minimize the cathode-electrolyte interfacial reactions. For example, the surface modification (e.g., coating) of the $LiCoO_2$ cathode with oxides such as $Al_2O_3$,[13-16] $TiO_2$,[13] $ZrO_2$,[14] $MgO$,[15] and $SnO_2$[17] have been shown to improve the cyclability to higher cutoff charge voltages, offering an increase in reversible capacity from 140 to about 180 mAh/g. Similarly, the surface modification of $Li[Li_{0.2}Ni_{0.2}Mn_{0.6}]O_2$ with $Al(OH)_3$ improves the rate capability.[18]

The present invention provides a new series of cathodes $(1-x)Li[Li_{1/3}Mn_{2/3}]O_2 \cdot xLi[Mn_{0.5-y}Ni_{0.5-y}Co_{2y}]O_2$ that belong to a solid solution between layered $Li[Li_{1/3}Mn_{2/3}]O_2$ and $Li[Mn_{0.5-y}Ni_{0.5-y}Co_{2y}]O_2$, their surface modification with $Al_2O_3$, $ZrO_2$, $CeO_2$, $SiO_2$, $ZnO$, $TiO_2$, and $SnO_2$ and surface and bulk modification with anions like $F^-$ and cations like $Al^{3+}$, and a comparison of their electrochemical performances before and after surface or bulk modification. For a comparison, the electrochemical performance of the cobalt-free $Li[Li_{0.17}Mn_{0.58}Ni_{0.25}]O_2$ that belongs to a previously known solid solution series $(1-x)Li[Li_{1/3}Mn_{2/3}]O_2 \cdot xLi[Mn_{0.5}Ni_{0.5}]O_2$ is also presented before and after surface modification with $Al_2O_3$. The surface modified $Li[Li_{0.2}Mn_{0.54}Ni_{0.13}Co_{0.13}]O_2$ exhibits a high capacity of 285 mAh/g with excellent cyclability and a low irreversible capacity loss of 40 mAh/g.

$Li[Li_{0.2}Mn_{0.54}Ni_{0.13}Co_{0.13}]O_2$ (x=0.4 and y=⅙) and $Li[Li_{0.1}Mn_{0.43}Ni_{0.23}Co_{0.23}]O_2$ (x=0.7 and y=⅙) in the series $(1-x)Li[Li_{1/3}Mn_{2/3}]O_2 \cdot xLi[Mn_{0.5-y}Ni_{0.5-y}Co_{2y}]O_2$ as well as $Li[Li_{0.17}Mn_{0.58}Ni_{0.25}]O_2$ (x=0.5 and y=0)[3-7] were synthesized by a co-precipitation method. Required amounts of the transition metal acetates were dissolved in deionized water and then added drop by drop into a 0.1 M KOH solution to form the coprecipitated hydroxides of Mn, Ni, and Co. After drying overnight at 100° C. in an air-oven, the coprecipitated hydroxides were mixed with required amount of lithium hydroxide, fired in air at 900° C. for 24 hours, and then quenched into liquid nitrogen. The surface modification of the synthesized layered oxides was carried out by dispersing the powders in an aluminum nitrate solution, followed by adding ammonium hydroxide to precipitate aluminum hydroxide and heating the products at about 300° C. in air for 4 hours so that the $Al_2O_3$ content in the final product is 3 weight percent.[14] All the samples were characterized by X-ray diffraction (XRD). Lithium content was determined by atomic absorption spectroscopy. Microstructural characterizations were carried out with a JEOL 2010F high-resolution transmission electron microscope (TEM).

For example, cathodes for evaluating the electrochemical performances were prepared by mixing 75 weight percent active material with 20 weight percent acetylene black and 5 weight percent PTFE binder, rolling the mixture into thin sheets of about 0.1 mm thick, and cutting into circular electrodes of 0.64 $cm^2$ area. CR2032 coin cells were then assembled with the cathode thus fabricated, lithium anode, and 1 M $LiPF_6$ in ethylene carbonate (EC)/diethyl carbonate (DEC) electrolyte.

FIG. 1 compares the XRD patterns of Li[Li$_{0.2}$Mn$_{0.54}$Ni$_{0.13}$Co$_{0.13}$]O$_2$, Li[Li$_{0.1}$Mn$_{0.43}$Ni$_{0.23}$Co$_{0.23}$]O$_2$, Li[Li$_{0.17}$Mn$_{0.58}$Ni$_{0.25}$]O$_2$, and Al$_2$O$_3$ modified Li[Li$_{0.2}$Mn$_{0.54}$Ni$_{0.13}$Co$_{0.13}$]O$_2$. All the samples have the O3 type structure of LiCoO$_2$ similar to that found previously for Li[Li$_{0.17}$Mn$_{0.58}$Ni$_{0.25}$]O$_2$,[3-7] and TABLE 1 gives the lattice parameter values of the layered oxide compositions.

TABLE 1

| Composition | a (Å) | c (Å) | c/a |
|---|---|---|---|
| Li[Li$_{0.2}$Mn$_{0.54}$Ni$_{0.13}$Co$_{0.13}$]O$_2$ | 2.8518 | 14.2255 | 4.983 |
| Li[Li$_{0.1}$Mn$_{0.43}$Ni$_{0.23}$Co$_{0.23}$]O$_2$ | 2.8637 | 14.2503 | 4.976 |
| Li[Li$_{0.17}$Mn$_{0.58}$Ni$_{0.25}$]O$_2$ | 2.8671 | 14.2557 | 4.972 |

Rietveld refinement indicated a cation disorder of around 5%, which is consistent with the previous report for Li[Li$_{0.17}$Mn$_{0.58}$Ni$_{0.25}$]O$_2$[3] The very weak reflections around 20-30° are due to the superlattice ordering of Li$^+$ and Mn$^{4+}$ in the transition metal layer as has been suggested before.[3,5,11] The XRD patterns remain unchanged after modifying the surface with Al$_2$O$_3$ as seen in FIG. 1b, indicating that the surface modification does not cause any undue bulk structural changes to the cathodes. No extra reflections corresponding to Al$_2$O$_3$ are seen, possibly due to the small quantity (e.g., about 3 weight percent) and amorphous nature.

Figure 2:
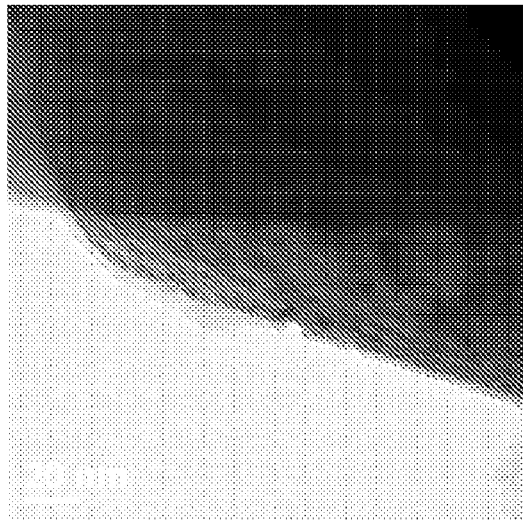
FIGS. 2a and 2b are TEM images of $Al_2O_3$-modified $Li[Li_{0.2}Mn_{0.54}Ni_{0.13}Co_{0.13}]O_2$ at different magnifications.
Figure 2:
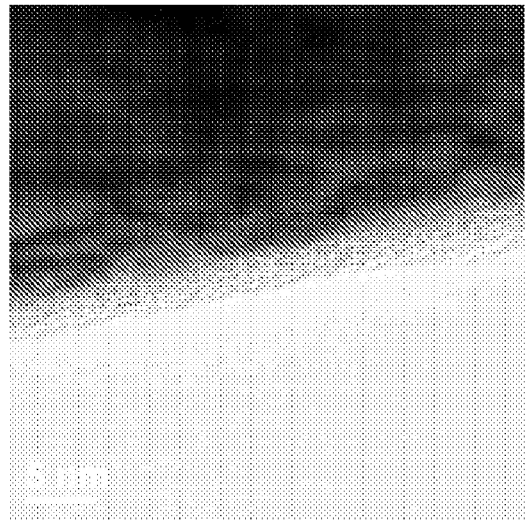

FIG. 2 shows the TEM images of Al$_2$O$_3$ modified Li[Li$_{0.2}$Mn$_{0.54}$Ni$_{0.13}$Co$_{0.13}$]O$_2$ at two magnifications. The image and energy dispersive spectroscopic (EDS) analysis indicates a smooth, porous layer containing aluminum on the cathode particle surface. For simplicity, the coating material is designated as Al$_2$O$_3$; however, the coating material could be present as an amorphous AlOOH, considering the low firing temperature of 300° C.[14]

Figure 3:
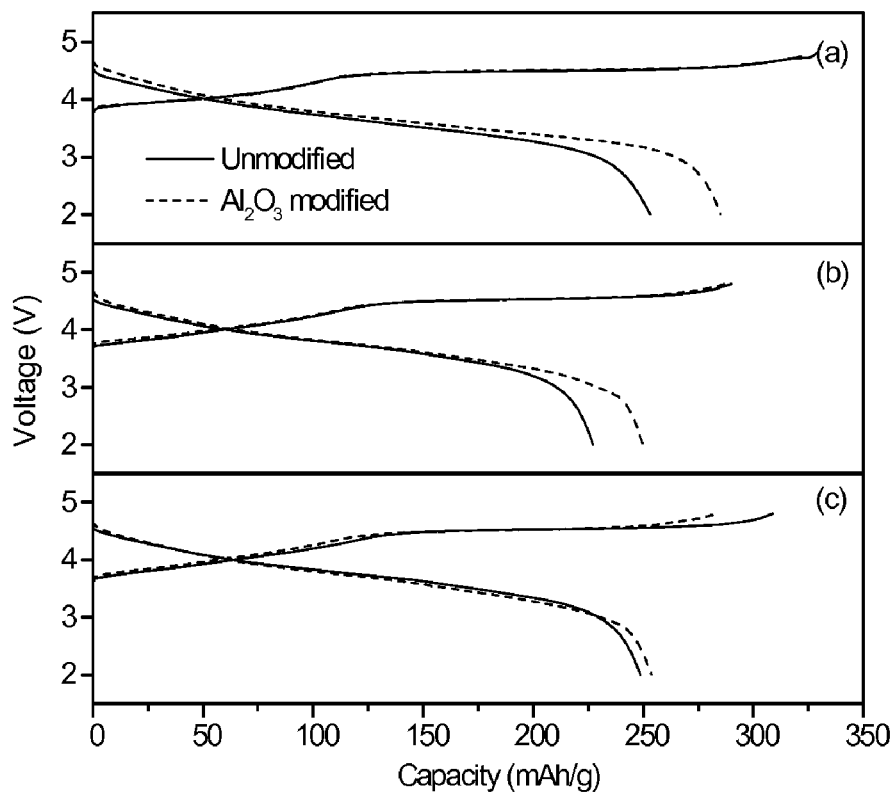
FIG. 3 is a graph comparing the first charge-discharge profiles of samples before and after surface modification with $Al_2O_3$.

FIGS. 3a, 3b and 3c are graphs that compare the first charge-discharge profiles of Li[Li$_{0.2}$Mn$_{0.54}$Ni$_{0.13}$Co$_{0.13}$]O$_2$, Li[Li$_{0.1}$Mn$_{0.43}$Ni$_{0.23}$Co$_{0.23}$]O$_2$, and Li[Li$_{0.17}$Mn$_{0.58}$Ni$_{0.25}$]O$_2$ before and after surface modification with Al$_2$O$_3$ in the voltage range of 2.0-4.8 V at C/20 rate.

Table 2 compares the first charge and discharge capacities and the irreversible capacity loss values. All three systems exhibit lower irreversible capacity loss and higher discharge capacities after surface modification with Al$_2$O$_3$ due to a suppression of the reaction between the cathode surface and the electrolyte and an optimization of the solid-electrolyte interface (SEI) layer. TABLE 2 illustrates the electrochemical cell data collected at C/20 rate and 2.0-4.8 V of the layered oxide cathodes before and after surface modification with Al$_2$O$_3$.

For example, the irreversible capacity loss decreases from 75 to 41 mAh/g and the discharge capacity increases from 253 to 285 mAh/g after surface modification in the case of Li[Li$_{0.2}$Mn$_{0.54}$Ni$_{0.13}$Co$_{0.13}$]O$_2$. Similarly, irreversible capacity loss decreases from 63 to 38 mAh/g and the discharge capacity increases from 227 to 250 mAh/g in the case of Li[Li$_{0.1}$Mn$_{0.43}$Ni$_{0.23}$Co$_{0.23}$]O$_2$. In contrast, while the irreversible capacity loss decreases significantly from 60 to 30 mAh/g, the capacity increases only slightly from 249 to 254 mAh/g in the case of the cobalt-free Li[Li$_{0.17}$Mn$_{0.58}$Ni$_{0.25}$]O$_2$ cathode. Thus the surface modification offers the advantage of increasing the discharge capacity significantly in the newly developed cobalt-containing Li[Li$_{(1-x)/3}$Mn$_{(2-x)/3}$Ni$_{x/3}$Co$_{x/3}$]O$_2$ series compared to the cobalt-free Li[Li$_{(1/3-2x/3)}$Mn$_{(2/3-x/3)}$Ni$_x$]O$_2$ series. Moreover, the capacity of 285 mAh/g observed with Li[Li$_{0.2}$Mn$_{0.54}$Ni$_{0.13}$Co$_{0.13}$]O$_2$ is significantly higher than the values reported previously in the literature for any layered oxide composition (<about 255 mAh/g). It corresponds to a reversible extraction of 0.9 lithium ion per LiMO$_2$ formula unit (e.g., about 90% of theoretical capacity).

Figure 4:
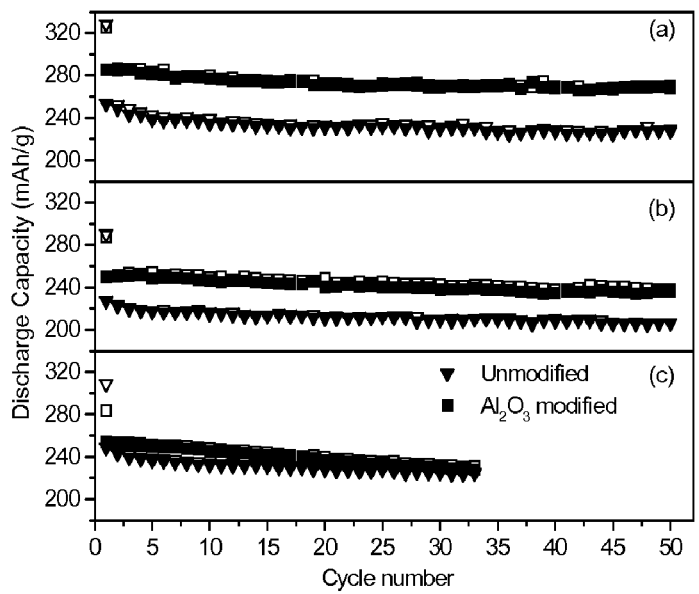
FIG. 4 is a graph comparing the cyclability data of samples before and after surface modification with $Al_2O_3$.

FIGS. 4a, 4b and 4c are graphs that compare the cyclability data of all the three systems before and after surface modification with Al$_2$O$_3$ at C/20 rate, and the capacity fades per cycle are given in TABLE 2. While both Li[Li$_{0.2}$Mn$_{0.54}$Ni$_{0.13}$Co$_{0.13}$]O$_2$ and Li[Li$_{0.1}$Mn$_{0.43}$Ni$_{0.23}$Co$_{0.23}$]O$_2$ belonging to the newly developed Li[Li$_{(1-x)/3}$Mn$_{(2-x)/3}$Ni$_{x/3}$Co$_{x/3}$]O$_2$ series show a significant improvement in capacity retention on surface modification, the cobalt-free Li[Li$_{0.17}$Mn$_{0.58}$Ni$_{0.25}$]O$_2$ does not show any improvement. Additionally, there is little difference between the discharge and charge capacities after the first cycle as seen in FIGS. 4a, 4b and 4c, indicating good coulombic efficiency.

Figure 5:
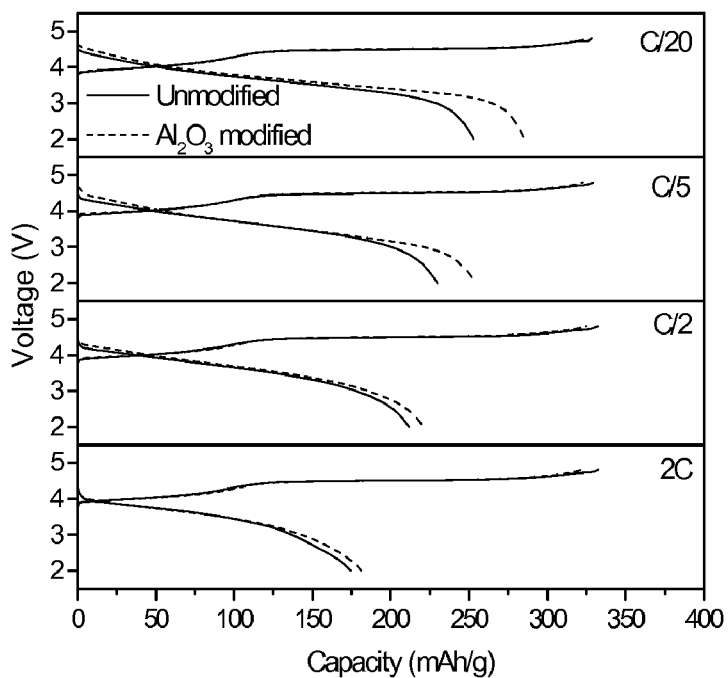
FIG. 5 is a graph comparing the rate capabilities of $Li[Li_{0.2}Mn_{0.54}Ni_{0.13}Co_{0.13}]O_2$ before and after surface modification with $Al_2O_3$.

FIG. 5 compares the rate capability of Li[Li$_{0.2}$Mn$_{0.54}$Ni$_{0.13}$Co$_{0.13}$]O$_2$ at C/20, C/5, C/2 and 2 C before and after surface modification with Al$_2$O$_3$. The surface modified cathode shows higher discharge capacity than the unmodified cathode at all rates. However, the difference between the discharge capacities of the surface modified and unmodified cathodes decreases as the C rate increase, indicating a slightly lower rate capability for the surface modified sample.

Surface modification of three materials in the system (1−x)Li[Li$_{1/3}$Mn$_{2/3}$]O$_2$·xLi[Mn$_{0.5-y}$Ni$_{0.5-y}$Co$_{2y}$]O$_2$ with x=0.5 and y=0, x=0.4 and y=⅙, and x=0.4 and y=⅓ were also carried out with different oxides (Al$_2$O$_3$, CeO$_2$, ZrO$_2$, ZnO, SiO$_2$) and fluorine. The surface modifications with Al$_2$O$_3$, CeO$_2$, and ZnO were carried out similar to that presented before with

TABLE 2

| Composition | Theoretical capacity (mAh/g)[a] | | First charge capacity (mAh/g) | First discharge capacity (mAh/g) | Irreversible capacity loss (mAh/g) | Capacity fade per cycle (mAh/g) |
|---|---|---|---|---|---|---|
| Li[Li$_{0.2}$Mn$_{0.54}$Ni$_{0.13}$Co$_{0.13}$]O$_2$ | 321 | Unmodified | 328 | 253 | 75 | 0.53 |
|  |  | Al$_2$O$_3$ modified | 326 | 285 | 41 | 0.34 |
| Li[Li$_{0.1}$Mn$_{0.43}$Ni$_{0.23}$Co$_{0.23}$]O$_2$ | 304 | Unmodified | 290 | 227 | 63 | 0.42 |
|  |  | Al$_2$O$_3$ modified | 288 | 250 | 38 | 0.28 |
| Li[Li$_{0.17}$Mn$_{0.58}$Ni$_{0.25}$]O$_2$ | 316 | Unmodified | 309 | 249 | 60 | 0.79 |
|  |  | Al$_2$O$_3$ modified | 284 | 254 | 30 | 0.80 |

Figure 6:
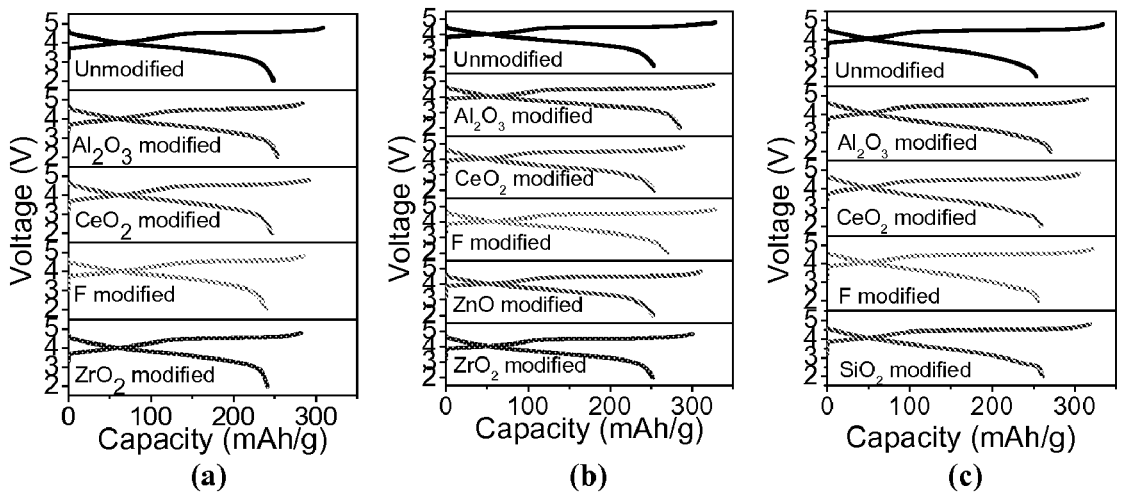
FIGS. 6a, 6b and 6c are graphs comparing the first charge-discharge profiles of unmodified and surface modified samples.

[a]Calculated based on the extraction of one lithium per LiMO$_2$ formula $Al_2O_3$ by dispersing the cathode powder in the corresponding metal salt precursor solution, followed by adding ammonium hydroxide to precipitate the metal hydroxides. The surface modifications with $ZrO_2$ and $SiO_2$ were carried out by dispersing the cathode powder in the corresponding metal alkoxide solution, followed by adding water to hydrolyze the alkoxide and generate the metal hydroxides. In both the cases, the resulting product was heated at a temperature between 300° C. and 700° C. in air for 4 hours so that the metal oxide content in the final product is 3 weight percent. The surface modification with fluoride was carried out by heating the already formed layered oxide cathodes with $NH_4HF_2$ at a low temperature of between 300 and 500° C. for about 4 hours. The first charge-discharge profiles are compared in FIG. 6. All the surface modifications reduce the irreversible capacity loss; among them, $Al_2O_3$ modification is the most effective one. For example, the discharge capacity increased from 253 to 285 mAh/g and the irreversible capacity loss decreased from 75 to 41 mAh/g for the sample with x=0.4 and y=⅙.

FIGS. 6a, 6b and 6c are graphs comparing the first charge-discharge profiles of unmodified and surface modified samples belonging to the series $(1-x)Li[Li_{1/3}Mn_{2/3}]O_2 \cdot xLi[Mn_{0.5-y}Ni_{0.5-y}Co_{2y}]O_2$ at C/20 rate and 2.0-4.8V with (a) x=0.5 and y=0, (b) x=0.4 and y=⅙, and (c) x=0.4 and y=⅓.

Figure 7:
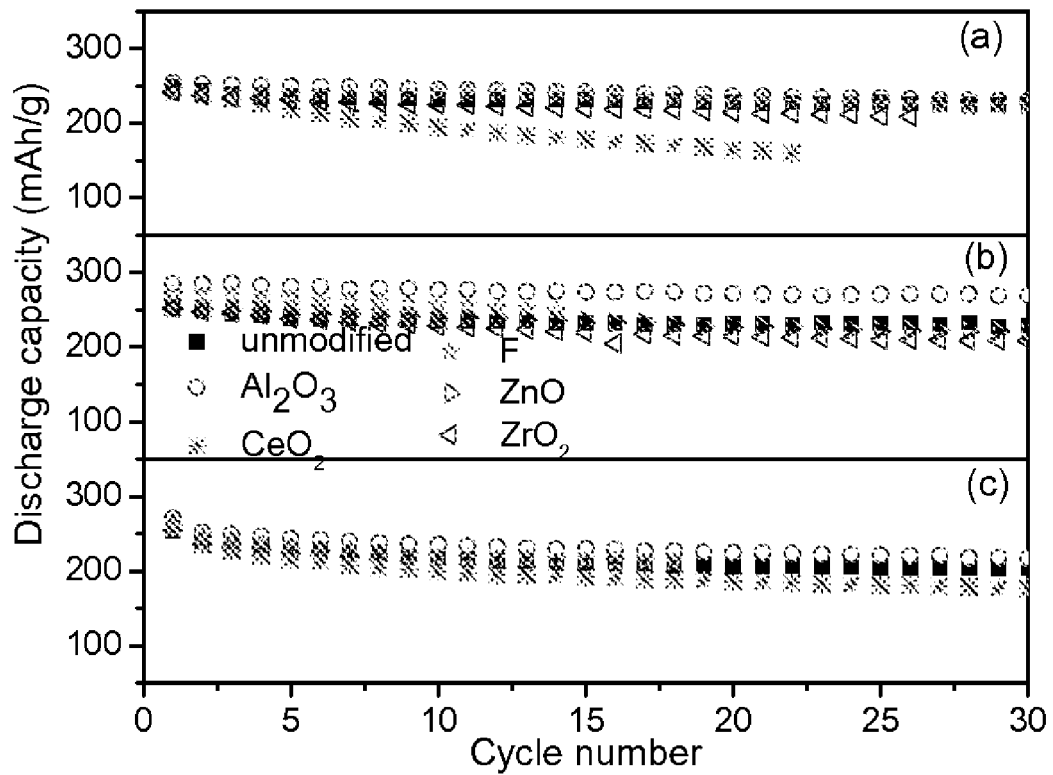
FIGS. 7a, 7b, and 7c are graphs comparing the cyclabilities of the unmodified and surface modified samples.

The cyclabilities of the different modified samples are compared in the graphs of FIGS. 7a, 7b and 7c. It gives a comparison of the cyclablities of the unmodified and surface modified samples belonging to the series $(1-x)Li[Li_{1/3}Mn_{2/3}]O_2 \cdot xLi[Mn_{0.5-y}Ni_{0.5-y}Co_{2y}]O_2$ at C/20 rate and 2.0-4.8V for x=0.5 and y=0 (FIG. 7a), x=0.5 and y=⅙ (FIG. 7b), and x=0.4 and y=⅓ (FIG. 7c). Samples modified with fluorine seem to have slightly better cycle performance, while the oxide modified samples have almost the same or worse cyclability than the unmodified sample. Again for the x=0.4 and y=⅙ sample modified with $Al_2O_3$, the discharge capacity is still as high as 268 mAh/g after 50 cycles.

The effects of partial substitution of $Al^{3+}$ or $Li^+$ in the transition metal layer and partial substitution of $F^-$ for $O^{2-}$ in $Li[Li_{0.17}Ni_{0.25}Mn_{0.58}]O_2$ (x=0.5 and y=0 sample) have also been investigated in detail. The fluorine substitution was accomplished by firing the coprecipitated transition metal hydroxides with a mixture of required amounts lithium fluoride and lithium hydroxide at 900° C. for 24 hours and then quenching into liquid nitrogen. The aluminum substitution was accomplished by incorporating a required amount of $Al^{3+}$ ions into the mixed transition metal ion solution before forming the coprecipitated hydroxides, followed by firing the coprecipitated hydroxides with lithium hydroxide at 900° C. for 24 hours and then quenching into liquid nitrogen. It was found that cationic and anionic substitutions influence the performance of the cathodes dramatically.

Figure 8:
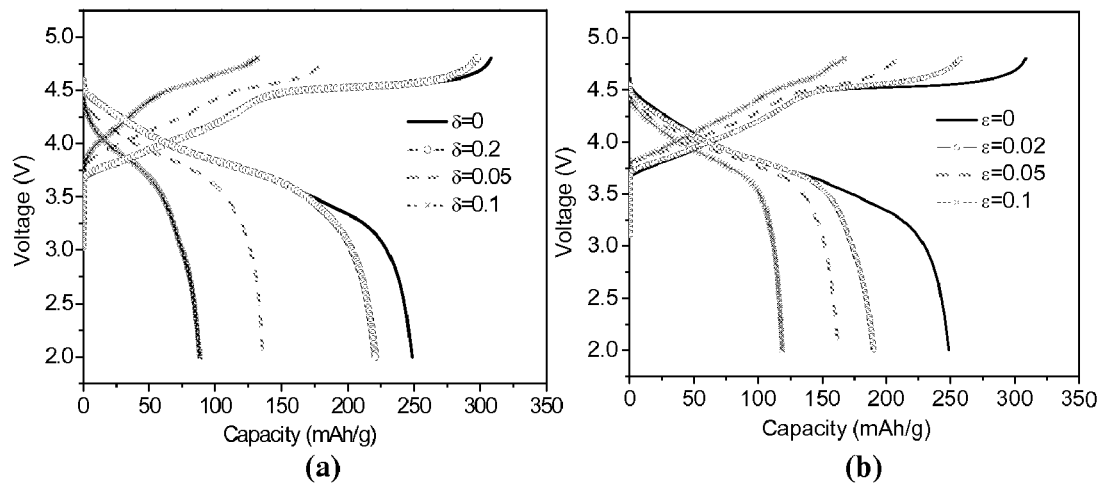
FIGS. 8a and 8b are graphs comparing the first charge-discharge profiles of samples.

FIGS. 8a and 8b are graphs comparing the first charge-discharge profiles of $Li[Li_{0.17-\delta}Al_\delta Mn_{0.58}Ni_{0.25}]O_2$ in FIG. 8a and $Li[Li_{0.17}Mn_{0.58}Ni_{0.25}]O_{2-\epsilon}F_\epsilon$ in FIG. 8b. As shown in FIG. 8, a small amount of substitution decreases the capacity. According to the cyclic voltammetry (CV) studies, Al and F substitutions strongly alter the chemical environment of $Li[Li_{0.17}Mn_{0.58}Ni_{0.25}]O_2$ and make it more difficult for the oxygen ion to be removed from the lattice.

Figure 9:
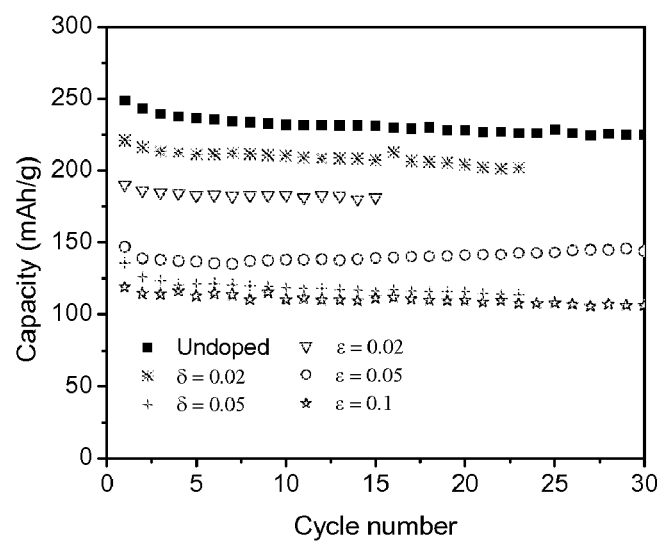
FIG. 9 is a graph comparing the cyclabilities of the $Li[Li_{0.17-\delta}Al_\delta Mn_{0.58}Ni_{0.25}]O_2$ and $Li[Li_{0.17}Mn_{0.58}Ni_{0.25}]O_{2-\epsilon}F_\epsilon$ cathodes.

FIG. 9 is a graph that compares the cyclabilities of the aluminum- and fluorine-substituted samples, $Li[Li_{0.17-\delta}Al_\delta Mn_{0.58}Ni_{0.25}]O_2$ and $Li[Li_{0.17}Mn_{0.58}Ni_{0.25}]O_{2-\epsilon}F_\epsilon$. Although the substitutions lead to a decrease in capacity values, the fluorine substitution leads to a better cyclability. The decrease in capacity is due to a decrease in the ability of the samples to lose oxygen from the lattice during the first charge. It is interesting to note that an incorporation of a very small amount (<0.05) of foreign ions like $Al^{3+}$ or $F^-$ results in a significant change in the ability to lose oxygen from the lattice on charging.

Thus, cationic and anionic substitutions could be used effectively to control the irreversible loss of oxygen from the lattice and the electrochemical performance factors such as reversible capacity, cyclability, and irreversible capacity loss. It could also help to tune the chemical stability and safety. The surface modification to reduce the irreversible capacity loss could also be pursued with other materials like carbon, metal, and other oxides like $SnO_2$, CoO, NiO, and CuO. Combining the ion substitution and the surface modification may produce materials that have less oxygen loss, lower IRC, and high capacity.

The $(1-x)Li[Li_{1/3}Mn_{2/3}]O_2 \cdot xLi[Mn_{0.5-y}Ni_{0.5-y}Co_{2y}]O_2$ cathode composition has an x value between about 0.0 and about 1.0 and y value between 0 and 0.5, e.g., when x=0.5 and y=0, the resulting cathode composition is $Li[Li_{0.17}Mn_{0.58}Ni_{0.25}Co_{0.0}]O_2$, when x=0.4 and y=⅙, the resulting cathode composition is $Li[Li_{0.2}Mn_{0.54}Ni_{0.13}Co_{0.13}]O_2$, when x=0.7 and y=⅙, the resulting cathode composition is $Li[Li_{0.1}Mn_{0.44}Ni_{0.23}Co_{0.23}]O_2$, when x=1.0 and y=⅙, the resulting cathode composition is $Li[Mn_{1/3}Ni_{1/3}Co_{1/3}]O_2$, and when x=0.4 and y=⅓, the resulting composition is $Li[Li_{1/5}Co_{4/15}Ni_{1/15}Mn_{7/15}]O_2$.

In addition, the $(1-x)Li[Li_{1/3}Mn_{2/3}]O_2 \cdot xLi[Mn_{0.5-y}Ni_{0.5-y}Co_{2y}]O_2$ cathode composition may be made from mixing two or more co-precipitated transition metal hydroxides dried at about 90-120° C. for between 12 and 36 hours with lithium hydroxide. The $(1-x)Li[Li_{1/3}Mn_{2/3}]O_2 \cdot xLi[Mn_{0.5-y}Ni_{0.5-y}Co_{2y}]O_2$ cathode composition may be fired at between 800-1000° C. for 12 to 36 hours.

In addition, the present invention may be doped with Mg, Ti, V, Cr, Fe, Cu, Zn, Zr, Nb, Mo, W, Ga, Ca, Sr, Si, and B or combinations thereof.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

1. R. V. Chebaim, F. Prado, and A. Manthiram, Chem. Mater., 13, 2951 (2001).
2. S. Venkatraman, Y. Shin, and A. Manthiram, Electrochem. Solid State Lett., 6, A9 (2003).
3. Z. Lu, L. Y. Beaulieu, R. A. Donaberger, C. L. Thomas, and J. R. Dahn, J. Electrochem. Soc., 149, A778 (2002).
4. S. H. Kang, Y. K. Sun, and K. Amine, Electrochem. Solid State Lett., 6, A183 (2003).
5. Y. J. Park, Y. S. Hong, X. Wu, K. S. R, and S. H. Chang, J. Power Sources, 129, 288 (2004).
6. S. H. Kang and K. Amine, J. Power Sources, 124, 533 (2003).
7. D. A. R. Barkhouse and J. R. Dahn, J. Electrochem. Soc., 152, A746 (2005).
8. J. Jiang, K. W. Eberman, L. J. Krause, and J. R. Dahn, J. Electrochem. Soc., 152, A1879 (2005).
9. L. Zhang and H. Noguchi, J. Electrochem. Soc., 150, A601 (2003).
10. B. Ammundsen, J. Paulsen, and I. Davidson, J. Electrochem. Soc., 149, A431 (2002).
11. Z. H. Lu and J. R. Dahn, J. Electrochem. Soc., 149, A815 (2002).
12. A. D. Robertson and P. G. Bruce, Electrochem. Solid State Lett., 7, A294 (2004).
13. Y. J. Kim, T. J. Kim, J. W. Shin, B. Park, and J. Cho, J. Electrochem. Soc., 149, A1337 (2002).
14. A. M. Kannan, L. Rabenberg, and A. Manthiram, Electrochem. Solid State Lett., 6, A16 (2003).
15. H.-J. Kweon, J. Park, J. W. Seo, G. Kim, B. Jung, and H. S. Lim, J. Power Sources, 126, 156 (2004).
16. S-K. Myung, K. Izumi, S. Komaba, Y-K. Sun, H. Yashiro, and N. Kumagai, Chem. Mater., 17, 3695 (2005).
17. J. Cho, C.-S. Kim, and S.-I. Yoo, Electrochem. Solid State Lett., 3, 362 (2000).
18. Y.-J. Kang, J.-H. Kim, S.-W. Lee, and Y.-K. Sun, Electrochimica Acta, 50, 4784 (2005).

What is claimed is:

1. A method, comprising:
adding two or more transition metal acetate solutions to a basic solution to form two or more co-precipitated transition metal hydroxides comprising two or more hydroxides of Mn, Ni or Co;
mixing the two or more co-precipitated transition metal hydroxides with lithium hydroxide; and
heating the two or more co-precipitated transition metal hydroxides-lithium hydroxide mixture to form a $(1-x)Li[Li_{1/3}Mn_{2/3}]O_2 \cdot xLi[Mn_{0.5-y}Ni_{0.5-y}Co_{2y}]O_2$ material having an O3 crystal structure, wherein x is between 0.0 and 1.0 and y is from 0.0 to less than 0.5.

2. The method of claim 1, wherein the basic solution is selected from the group consisting of lithium hydroxide, sodium hydroxide, potassium hydroxide, rubidium hydroxide, cesium hydroxide, magnesium hydroxide, calcium hydroxide, strontium hydroxide, barium hydroxide, ammonium hydroxide and combinations thereof.

3. The method of claim 1, further comprising drying the two or more co-precipitated transition metal hydroxides at about 90-120° C. for between 12 and 36 hours.

4. The method of claim 1, wherein the heating occurs at between 800-10000° C. for 12 to 36 hours.

5. The method of claim 2, wherein the $(1-x)Li[Li_{1/3}Mn_{2/3}]O_2 \cdot xLi[Mn_{0.5-y}Ni_{0.5-y}Co_{2y}]O_2$ material is selected from the group consisting of $Li[Li_{0.17}Mn_{0.58}Ni_{0.25}Co_{0.0}]O_2$, $Li[Li_{0.2}Mn_{0.54}Ni_{0.13}Co_{0.13}]O_2$, $Li[Li_{0.1}Mn_{0.44}Ni_{0.23}Co_{0.23}]O_2$, $Li[Mn_{1/3}Ni_{1/3}Co_{1/3}]O_2$, $Li[Li_{1/5}Co_{4/15}Ni_{1/5}Mn_{7/15}]O_2$ and mixtures thereof.

6. The method of claim 1, further comprising incorporating the $(1-x)Li[Li_{1/3}Mn_{2/3}]O_2 \cdot xLi[Mn_{0.5-y}Ni_{0.5-y}Co_{2y}]O_2$ material into a lithium-ion battery to produce a capacity of between about 250 and 300 mAh/g and an irreversible capacity loss of between about 20 and 50 mAh/g.

7. The method of claim 1, wherein the $(1-x)Li[Li_{1/3}Mn_{2/3}]O_2 \cdot xLi[Mn_{0.5-y}Ni_{0.5-y}Co_{2y}]O_2$ material is selected from the group consisting of $Li[Li_{0.17}Mn_{0.58}Ni_{0.25}Co_{0.0}]O_2$, $Li[Li_{0.2}Mn_{0.54}Ni_{0.13}Co_{0.13}]O_2$, $Li[Li_{0.1}Mn_{0.44}Ni_{0.23}Co_{0.23}]O_2$, $Li[Mn_{1/3}Ni_{1/3}Co_{1/3}]O_2$, $Li[Li_{1/5}Co_{4/15}Ni_{1/15}Mn_{7/15}]O_2$ and combinations thereof.

8. A cathode composition, comprising: $(1-x)Li[Li_{1/3}Mn_{2/3}]O_2 \cdot xLi[Mn_{0.5-y}Ni_{0.5-y}Co_{2y}]O_2$ having an O3 crystal structure, wherein x is between 0.0 and 1.0, y is between 0.0 and 0.5, and the $(1-x)Li[Li_{1/3}Mn_{2/3}]O_2 \cdot xLi[Mn_{0.5-y}Ni_{0.5-y}Co_{2y}]O_2$ has a capacity between about 250 and 300 mAh/g and an irreversible capacity loss of between about 20 and 50 mAh/g when incorporated in a lithium ion battery.

9. The cathode composition of claim 8, wherein the $(1-x)Li[Li_{1/3}Mn_{2/3}]O_2 \cdot xLi[Mn_{0.5-y}Ni_{0.5-y}Co_{2y}]O_2$ is incorporated into a lithium-ion battery.

10. The cathode composition of claim 8, wherein the $(1-x)Li[Li_{1/3}Mn_{2/3}]O_2 \cdot xLi[Mn_{0.5-y}Ni_{0.5-y}Co_{2y}]O_2$ is selected from the group consisting of $Li[Li_{0.17}Mn_{0.58}Ni_{0.25}Co_{0.0}]O_2$, $Li[Li_{0.2}Mn_{0.54}Ni_{0.13}Co_{0.13}]O_2$, $Li[Li_{0.1}Mn_{0.44}Ni_{0.23}Co_{0.23}]O_2$, $Li[Mn_{1/3}Ni_{1/3}Co_{1/3}]O_2$, and $Li[Li_{1/5}Co_{4/15}Ni_{1/15}Mn_{7/15}]O_2$.

11. The method of claim 1, further comprising:
mixing the $Li(1-x)Li[Li_{1/13}Mn_{2/3}]O_2 \cdot xLi[Mn_{0.5-y}Co_{2y}]O_2$ material with a conductive diluent and a binder to provide a mixture; and
forming the mixture into a general cathode shape to provide a cathode.

12. The method of claim 11, wherein the binder comprises powdered polytetrafluoroethylene or polyvinylidene fluoride, and the conductive diluent is selected from the group consisting of acetylene black, carbon black, graphite, nickel powder, aluminum powder, titanium powder, stainless steel powder and combinations thereof.

13. The method of claim 11, wherein the binder comprises powdered polytetrafluoroethylene at about 1 to about 10 weight percent of the mixture, the conductive diluent comprises acetylene black at about 5 to about 25 weight percent of the mixture, and the $(1-x)Li[Li_{1/3}Mn_{2/3}]O_2 \cdot xLi[Mn_{0.5-y}Ni_{0.5-y}Co_{2y}]O_2$ material comprises about 70 to about 95 weight percent of the mixture.

14. A method, comprising:
dispersing a $(1-x)Li[Li_{1/3}Mn_{2/3}]O_2 \cdot xLi[Mn_{0.5-y}Ni_{0.5-y}Co_{2y}]O_2$ composition in a metal salt precursor solution to form a first combination, wherein x is between 0.0 and 1.0 and y is between 0.0 and 0.5;
adding ammonium hydroxide to the first combination to precipitate a metal hydroxide, wherein a layered oxide containing the metal hydroxide is formed; and
heating the layered oxide containing the metal hydroxide, wherein a surface modified layered oxide is formed having a capacity between about 250 and 300 mAh/g and an irreversible capacity loss of between about 20 and 50 mAh/g when incorporated in a lithium ion battery.

15. The method of claim 14, wherein the metal salt precursor solution comprises Al, Ce, Zn, Sn or combinations thereof at between about 1 and 10 weight percent in the final product.

16. The method of claim 14, wherein the layered oxide containing the metal oxide is heated at a temperature between about 300° C. and about 700° C. for between about 1 and 6 hours.

17. A method, comprising:
co-precipitating a metal hydroxide mixture comprising hydroxides of two or more transition metal ions and one or more metal ions;
forming a mixture comprising the co-precipitated metal hydroxide mixture and lithium hydroxide; and
heating the mixture at a temperature between about 800° C. and about 1000° C. to form a cationic substituted bulk modified cathode composition of $(1-x)Li[Li_{1/3}Mn_{2/3}]O_2 \cdot xLi[Mn_{0.5-y}Ni_{0.5-y}Co_{2y}]O_2$,
wherein x is between 0.0 and 1.0, and y is from 0.0 to less than 0.5.

18. The method of claim 17, wherein the one or more transition metal ions are selected from the group consisting of Mg, Ti, V, Cr, Fe, Cu, Zn, Zr, Nb, Mo, W, Ga, Ca, and Cd and combinations thereof 19. The method of claim 17, further comprising:
disposing the cationic substituted bulk modified cathode composition in a metal salt precursor solution to form a first combination;
adding ammonium hydroxide to the first combination to precipitate a metal hydroxide, wherein a layered oxide containing the metal hydroxide is formed; and
heating the layered oxide containing the metal hydroxide, wherein a surface modified layered oxide is formed.

20. A cathode composition formed by the method of claim 17.

21. The method of claim 17, further comprising an anionic substitution compound.

22. The method of claim 21, wherein the anionic substitution compound comprises lithium fluoride, lithium chloride, lithium sulfide or a combination thereof.

23. The method of claim 17, further comprising forming the cathode composition into a cathode.

24. The method of claim 19, wherein the metal salt precursor solution comprises a member selected from the group consisting of selected from Al, Ce, Zn, Zr, Si, Ti, Sn and combinations thereof 25. The method of claim 24, wherein the surface modified layered oxide has a capacity between about 250 and 300 mAh/g and an irreversible capacity loss of between about 20 and 50 mAh/g when incorporated in a lithium ion battery.

26. The method of claim 24, wherein the layered oxide containing the metal oxide is heated at a temperature between about 300° C. and about 700° C. for between about 1 and 6 hours.

27. The method of claim 24, wherein the metal hydroxide is selected from the group consisting of aluminum hydroxide, cerium hydroxide, zirconium hydroxide, silicon hydroxide, titanium hydroxide and zinc hydroxide.

28. The method of claim 24, wherein the metal hydroxide is aluminum hydroxide.

29. The method of claim 1, further comprising:
disposing the $(1-x)Li[Li_{1/3}Mn_{2/3}]O_2 \cdot xLi[Mn_{0.5-y}Ni_{0.5-y}Co_{2y}]O_2$ material in a metal salt precursor solution to form a first combination;
adding ammonium hydroxide to the first combination to precipitate a metal hydroxide, wherein a layered oxide containing the metal hydroxide is formed; and
heating the layered oxide containing the metal hydroxide, wherein a surface modified layered oxide is formed.

30. The method of claim 29, wherein the surface modified layered oxide has a capacity between about 250 and 300 mAh/g and an irreversible capacity loss of between about 20 and 50 mAh/g when incorporated in a lithium ion battery.

31. The method of claim 29, wherein the layered oxide containing the metal oxide is heated at a temperature between about 300° C. and about 700° C. for between about 1 and 6 hours.

32. The method of claim 29, wherein the metal salt precursor solution comprises a member selected from the group consisting of selected from Al, Ce, Zn, Zr, Si, Ti, Sn and combinations thereof.

33. The method of claim 29, wherein the metal hydroxide is selected from the group consisting of aluminum hydroxide, cerium hydroxide, zirconium hydroxide, silicon hydroxide, titanium hydroxide and zinc hydroxide.

34. The method of claim 29, wherein the metal hydroxide is aluminum hydroxide.

* * * * *

UNITED STATES PATENT AND TRADEMARK OFFICE
CERTIFICATE OF CORRECTION

PATENT NO. : 7,678,503 B2
APPLICATION NO. : 11/861248
DATED : March 16, 2010
INVENTOR(S) : Arumugam Manthiram It is certified that error appears in the above-identified patent and that said Letters Patent is hereby corrected as shown below:

Column 2,
Line 54, Delete "$O_2$," and insert -- $O_2$. --

Column 7,
Line 18, Delete "$O_2^3$" and insert -- $O_2$. --

Column 7,
Line 19, Delete "20-300" and insert -- 20-30° --

Column 12,
Line 33 claim 4, Delete "10000° C." and insert -- 1000°C. --

Column 12,
Line 53, claim 8, Delete "03" and insert -- O3 --

Column 12,
Line 55 claim 8, Delete "(1 -x)" and insert -- (1-x) --

Colunm 12,
Line 60 claim 9, Delete "(1 -x)" and insert -- (1-x) --

Column 13,
Line 49 claim 17, Delete "(1 -x)" and insert -- (1-x) --

Column 14,
Line 19 claim 25, Delete "claim 24," and insert -- claim 19, --

Column 14,
Line 23 claim 26, Delete "claim 24," and insert -- claim 19, --

Signed and Sealed this

Thirty-first Day of August, 2010

David J. Kappos
*Director of the United States Patent and Trademark Office*

Column 14,
Line 27 claim 27, Delete "claim 24," and insert -- claim 19, --

Column 14,
Line 31 claim 28, Delete "claim 24," and insert -- claim 19, --

Column 14,
Line 34 claim 29, Delete "(1 -x)" and insert -- (1-x) --